US007679027B2

(12) United States Patent
Bogatu

(10) Patent No.: US 7,679,027 B2
(45) Date of Patent: Mar. 16, 2010

(54) SOFT X-RAY LASER BASED ON Z-PINCH COMPRESSION OF ROTATING PLASMA

(75) Inventor: Ioan-Niculae Bogatu, San Diego, CA (US)

(73) Assignee: FAR-TECH, Inc., San Diego, CA (US)

( * ) Notice: Subject to any disclaimer, the term of this patent is extended or adjusted under 35 U.S.C. 154(b) by 371 days.

(21) Appl. No.: 11/082,352

(22) Filed: Mar. 17, 2005

(65) Prior Publication Data

US 2006/0232215 A1 Oct. 19, 2006

(51) Int. Cl.
*B23K 10/00* (2006.01)
*H01J 1/50* (2006.01)

(52) U.S. Cl. ............................ 219/121.54; 219/121.36; 313/161; 313/149

(58) Field of Classification Search .............. 219/121.6, 219/121.57, 121.48, 123; 313/161, 149; 376/141, 107; 315/108
See application file for complete search history.

(56) References Cited

U.S. PATENT DOCUMENTS 3,014,857 A * 12/1961 Gow et al. .................. 376/130
3,238,413 A * 3/1966 Karlheinz et al. ...... 315/111.61
3,388,314 A * 6/1968 Gould ..................... 250/493.1
3,426,233 A * 2/1969 Sileo et al. .................. 313/161
3,639,849 A * 2/1972 Bennett ...................... 376/105
4,417,178 A 11/1983 Geller et al.
4,458,148 A * 7/1984 Hirshfield et al. ........... 250/284
4,505,947 A * 3/1985 Vukanovic et al. .......... 427/452
4,536,640 A * 8/1985 Vukanovic ............. 219/121.52
5,478,608 A * 12/1995 Gorokhovsky .............. 427/571
6,417,625 B1 7/2002 Brooks et al.
6,972,421 B2 * 12/2005 Melnychuk et al. ..... 250/504 R
2003/0222586 A1 * 12/2003 Brooks et al. .......... 315/111.71
2004/0071267 A1 * 4/2004 Jacob et al. ................. 378/119

OTHER PUBLICATIONS

Schuurman et al., Stability of the screw pinch, 1969, Pergamon Press, Plasma Physics, vol. 11, pp. 495-506.*
Tomasetti et al., Far-field, near-field and interference patterns imaging in LiF crystals from a 46.9 nm . . . soft x-ray laser, Proc. of SPIE V. 5197, 2003, p. 127-135.
Ikehata et al., Effects of a Conducting Mesh . . . JxB Driven Rotating Plasmas, 1998 ICPP&25th Conf on Fusion and Plasma Physics, Praha, ECA vol. 22C (1998) p. 2690-2693.

(Continued)

*Primary Examiner*—Stephen J Ralis
(74) *Attorney, Agent, or Firm*—William A. Eklund

(57) ABSTRACT

A method and apparatus for producing soft x-ray laser radiation. A low pressure plasma column is created by electric discharge or by laser excitation inside a rotating containment tube. Rotation of the plasma is induced by viscous drag caused by rotation of the tube, or by magnetically driven rotation of the plasma as it is created in a plasma gun in the presence of an axial magnetic field, or both. A high power electrical discharge is then passed axially through the rotating plasma column to produce a rapidly rising axial current, resulting in z-pinch compression of the rotating plasma column, with resultant stimulated emission of soft x-ray radiation in the axial direction. A rotating containment tube used in combination with magnetically driven rotation of the plasma column results in a concave electron density profile that results in reduced wall ablation and also reduced refraction losses of the soft x-rays.

6 Claims, 5 Drawing Sheets

OTHER PUBLICATIONS

Rocca, J.J., Table-top soft x-ray lasers, Review of Scientific Instruments, vol. 70, No. 10, Oct. 1999, p. 3799-3827.

R. Ackermann et al., Triggering and guiding megavolt discharges by laser-induced filaments under rain conditions, Applied Phys. Lett., V. 85, No. 23, Dec. 6, 2004, p. 5781-5783.

R. Ackermann et al., Laser Lightning Rod, Physics Today, Feb. 2005, p. 9.

* cited by examiner

SOFT X-RAY LASER BASED ON Z-PINCH COMPRESSION OF ROTATING PLASMA

FIELD OF THE INVENTION

The invention disclosed and claimed herein is directed to a method and apparatus for producing stimulated emission of soft x-ray radiation, that is, soft-x-ray laser radiation, by z-pinch compression of a rotating plasma column.

BACKGROUND OF THE INVENTION

The z-pinch is a well known physical phenomenon. It is the basis for one of the simplest devices for containing and compressing a plasma, or gaseous mixture of electrons and ions. It has been extensively investigated in the quest for controlled nuclear fusion and as a source of x-rays and other forms of electromagnetic radiation. See for example L. A. Artsimovich, *Controlled Thermonuclear Reactions* (Gordon and Breach, New York, 1964), Chap. 5, Fast High Power Discharges; N. A. Krall and A. W. Trivelpiece, *Principles of plasma physics* (McGraw-Hill, New York, 1973), Chap. 3, p. 100-126; and M. A. Lieberman, J. S. De Groot, A. Toor, and R. B. Spielman, *Physics of high-density Z-pinch plasmas* (Springer-Verlag, New York, 1999), Chap. 7, Applications of Z Pinches, p. 236.

Briefly, when a gas is excited above a particular energy level a portion of the gas becomes ionized to form a plasma, which consists of a mixture of free electrons, gaseous ions, and gaseous atomic or molecular species remaining unionized. Gases can be ionized to form a plasma in various ways, including for example by the application of an electrical discharge, a laser beam, or microwave radiation. A recent example of plasma production by laser induced ionization of a gas is reported by Ackermann et al., Appl. Physics Letters, Vol. 85, No. 23, p. 5781 (2004).

When a high power electrical pulse is applied to a plasma column contained in a cylindrical tube, so as to create a rapidly increasing and large electrical current flowing through the plasma, there is generated a magnetic field which has azimuthal or cylindrical symmetry, with circular field lines centered on the axis of the plasma column. The rapidly increasing magnetic field confines and compresses the plasma radially inwardly toward the axis, thereby heating the plasma. This is known as z-pinch compression. The rising current driven axially through the plasma column produces an increasing azimuthally symmetric magnetic field and the pinching phenomenon of the column (z-pinch) takes place due to the magnetic pressure created by the interaction of the magnetic field and the current itself. This compression must take place in a sufficiently short time that the plasma cannot exchange heat with the surrounding gas. With a sufficiently high rate of increase in the current, the plasma is compressed essentially adiabatically and the work expended during by the radial magnetic compression is transformed into heat. Confinement, compression, and heating all occur essentially simultaneously.

Because both a high current and a high rate of increase in the current are needed, as a practical matter z-pinch compression can be achieved only in short bursts, driven by high voltage, high power electrical pulses. The extent of magnetic compression is effectively limited by the availability of suitable power supplies. In order to achieve the high power pulses needed for this purpose, capacitor-based and induction-based power supplies and the like have typically been used for z-pinch devices. Nevertheless, it is possible to obtain a balance between the radially outward pressure of the plasma and the radially inward magnetic compression on a time scale shorter than the time scale of the diffusion of the magnetic field into the plasma.

Despite the simplicity of this explanation, the actual physical phenomena are very complex, as the response of the z-pinch plasma leads to nonlinear hydrodynamic phenomena that result in detrimental instabilities, as well as multiple atomic processes including ionization, recombination, excitation, and radiation.

A soft x-ray laser based on z-pinch compression of a plasma has been previously reported, but only with non-rotating capillary tubes of limited length. See J. J. Rocca, V. Shlyaptsev, F. G. Tomasel, O. D. Cortazar, D. Hartshorn, and J. L. A. Chilla, Phys. Rev. Lett. 73, 2192 (1994), hereby incorporated by reference. To the best of our knowledge, and until present, capillary channels having lengths up to only approximately 45 cm have been used. See G. Tomasetti, A. Ritucci, A. Reale, L. Reale, L. Palladino, A. Faenov, T. Pikuz, F. Flora, L. Mezi, G. Baldacchini, R. M. Montereali, F. Bonfigli, L. Arrizza, S. V. Kukhlevsky, and J. Kaiser, Proceedings of SPIE Vol. 5197 Soft X-Ray Lasers and Applications V, San Diego, Calif., 127, (2003), edited by E. E. Feed and S. Suckewer, SPIE, Bellingham, 2003.

The previously known non-rotating capillary discharge x-ray laser involves a sequence of operations and phenomena. First, the gas in the tube must ordinarily be pre-ionized to form a cold plasma column. Pre-ionization plays a key role in achieving plasma column stability during the subsequent z-pinch.

Small diameter capillary tubes have been seen as desirable for such lasers because they were considered to require less electrical power to achieve sufficient z-pinch compression to result in generation of coherent x-rays. However, upon formation of the initial cold plasma by appropriate excitation of the gas in a capillary tube, some quantity of the capillary wall material is unavoidably ablated. This results in impurity atoms being ionized and introduced into the plasma, having a detrimental effect on the necessary parameters of the lasing plasma. Wall ablation in capillary discharges is unfavorable both for the compression and the stability of the plasma, and consequently has a detrimental effect on soft x-ray laser production. Further, the quantity of ablated material increases with the surface area of the capillary wall, which in turn increases with the length of the capillary. Consequently, since the laser radiation must pass through the entire length of the plasma column, the capillary length cannot be increased beyond several tens of centimeters, due to the requirements of high uniformity and stability as well as minimal quantity of material ablated from the wall during plasma formation. Accordingly, avoiding ablation is an important objective.

Capillary tubes have also been used because close proximity of the capillary wall to the plasma column has the advantage of suppressing instabilities in the z-pinch plasma. However, another disadvantage, in addition to the degradation of the plasma by contamination with ablated material, is that changing the initial composition of the ionized gas mixture through material ablation increases the cooling of the plasma through thermal conduction.

High-pressure plasma columns formed inside a rotating tube have been suggested as sources of non-coherent infrared, visible, ultraviolet and x-ray radiation. U.S. Pat. No. 6,417,625 to Brooks, for example, discloses the use of a rotating tube containing a feed gas at atmospheric pressure to achieve "vortex stabilization" for the purpose of stabilizing and containing an axially centered plasma column that is formed by any one of various processes, including formation by electrical discharge, microwave excitation or radio frequency excitation. The rotating tube creates an annular sheath of relatively cooler gas that functions to thermally and electrically isolate the high temperature plasma column from the inside wall of the rotating tube. There is obtained a stable, steady state plasma that continuously emits non-coherent radiation at wavelengths that are determined by the temperature of the plasma and the gaseous ionic species the plasma.

Stimulated emission of radiation from a plasma medium, or laser radiation, requires a population inversion of energy levels among the ionic and molecular species constituting the plasma, which exists whenever more atoms or ions are excited to an upper energy level than remain in a lower energy level. In this regard, the energy of a photon emitted in a radiative transition caused by decay of an electron from an excited energy level to a lower energy level of an ionic species is directly proportional to the energy difference between the upper and lower energy levels, and consequently a short-wavelength laser must have a large energy gap. However, the rate at which electrons in the upper energy level decay by the spontaneous decay, which defeats the creation of the population inversion necessary to achieve stimulated emission, increases extremely rapidly as the energy gap increases. Consequently, to achieve stimulated emission of radiation in the soft x-ray wavelength range not only is more energy necessary to raise atoms or ions from their ground state to the upper energy levels, but they must also be excited, or pumped, at a faster rate. Consequently the required pump power dramatically increases as higher energy radiation is sought. For efficient energy extraction of coherent radiation from a lasing medium such as a plasma, with its highly charged ions as radiation emitters, it is necessary to operate in the regime of gain saturation. This means to maintain the maximum possible population inversion by pumping the lasing medium so that the stimulated emission of radiation takes place over the longest obtainable optical path. In transient schemes, in which electrical current is increased rapidly, the population inversion in the plasma has a short life and the duration of the gain is much shorter than in optical lasers. Therefore, the stimulated emission and accompanying radiation amplification of soft x-ray radiation in a plasma takes place in a single or a double-pass through the lasing plasma medium. Consequently the plasma length plays a key role because the spectrally integrated intensity increases approximately exponentially with the plasma length according to Linford's formula. However, it is actually the length-to-diameter aspect ratio of the elongated plasma column, together with its very high uniformity, which are the crucial parameters for its quality as a lasing medium. The radiation traveling through the plasma column also experiences refraction produced by the spatial variation, particularly in the radial direction, of the electron density radial profile. Plasma columns having a density minimum on axis, or a concave radial profile of the electron density, have been achieved, primarily by rotation, as disclosed for example in Brooks.

Accordingly, it is an object and purpose of the present invention to provide an improved method and apparatus for producing soft x-ray laser radiation by z-pinch compression of a gaseous plasma.

It is also an object and purpose to provide a soft x-ray laser that is based on z-pinch compression of a rotating plasma and which is thereby characterized by reduced ablation of material from the walls of the plasma containment vessel.

It is yet another object and purpose to provide an improved method of producing soft x-ray laser radiation utilizing z-pinch compression of a low pressure gaseous plasma that is driven in rotation magnetically as well as mechanically.

It is a further object to provide a soft x-ray laser based on z-pinch compression of a plasma column, in which the density profile of the column results in reduced refraction losses of the laser radiation while also minimizing ablation of the containment vessel.

SUMMARY OF THE INVENTION

The present invention provides a method and apparatus for producing stimulated emission of soft x-ray radiation, that is, soft x-ray laser radiation, which is based on z-pinch compression of a rotating, low pressure plasma. The invention is based on the preliminary formation of an elongated, low pressure, rotating plasma column, followed by the application of a high power, rapidly increasing electric current flowing axially through the plasma column, so as to result in magnetic z-pinch compression of the plasma column and resulting stimulated emission of soft x-rays, primarily in the axial direction. The invention is characterized by high uniformity, high stability, and a high length-to-diameter aspect ratio of the lasing plasma medium, and by a radially concave density profile in the plasma column, which reduces optical losses due to refraction.

In accordance with the invention, an elongate plasma column is initially formed in a containment tube by ionization of a low pressure feed gas. The feed gas may be ionized to create the plasma by electrical discharge, laser induced ionization, radio frequency or microwave excitation, or any other method of ionizing the feed gas to produce an elongated plasma column. The plasma column is driven in rotation about its axis, either by mechanical viscous drag caused by rotation of the containment tube, or by magnetically driven rotation of the plasma as it is formed, or both.

In one preferred embodiment, the rotating plasma is produced by a plasma gun that extends into one end of the containment tube and which operates in the presence of an axially extending magnetic field produced by a solenoidal electromagnet coil positioned coaxially around the containment tube. The plasma gun includes a tubular, open-ended electrically conductive anode, and a tubular, electrically conductive cathode positioned coaxially within the tubular anode. A feed gas is introduced into the containment tube through the inner tubular cathode of the plasma gun. The end of the cathode is closed; however, the tubular wall of the cathode includes orifices through which the feed gas may be emitted radially outwardly into the annular space between the cathode and the anode. The feed gas is ionized as it is emitted radially into the annular space between the cathode and the anode, by application of an electric potential and the passage of an electric current trough the feed gas between the anode and the cathode. Ionization of the feed gas results in the formation of a plasma. The plasma is driven in rotation as it is formed by the force of the axial magnetic field acting on the current flowing radially through the emitted feed gas and the resulting plasma. The rotating plasma is then emitted from the end of the open-ended anode into the containment tube.

Upon formation of the rotating plasma column in the containment tube, a high power, rapidly increasing electrical current is passed radially through the plasma between electrodes located at opposite ends of the containment tube. The rapidly increasing current creates an azimuthally symmetric magnetic field that compresses the plasma radially inwardly by z-pinch compression, resulting in stimulated emission of soft x-rays along the axis of the plasma column. The apparatus of the invention includes a window at one end of the containment tube, through which the x-ray radiation is emitted.

The containment tube may be rotated mechanically so as to augment the magnetically driven rotation of the plasma by mechanically driven rotation caused by viscous drag of the interior wall of the rotating tube acting on the plasma and feed gas inside the tube.

In another embodiment of the method and apparatus of the invention, which does not utilize the magnetically driven rotation of the plasma induced by the plasma gun and the magnetic field as described above, initial ionization of the feed gas is achieved by application of an electric potential across, and passage of a resulting current through, a low pressure feed gas contained in a rotating containment tube. The potential is applied across electrodes located at opposite ends of the containment tube. Rotation of the plasma in this embodiment is accomplished solely by viscous drag of the rotating tube on the feed gas and plasma. Compression of the rotating plasma is achieved by z-pinch compression, as described above, caused by application of a high power, rapidly increasing electric current passing axially through the rotating plasma between electrodes at opposite ends of the containment tube, which electrodes may be the same as the electrodes used to create the initial plasma column.

In both of the embodiments described above, a stabilizing potential may be applied across the electrodes at opposite ends of the containment tube as the plasma column is formed, to stabilize and maintain the rotating plasma column until the high power z-pinch pulse is applied.

In accordance with another aspect of the invention, the rotating plasma may be produced by either a plasma gun or by application of an axial electric potential in a rotating containment tube, as described above; and the uniformity of the rotating plasma column may be improved by mechanically withdrawing the plasma gun, or alternately one of the electrodes, from the containment tube as the plasma is formed. Mechanical withdrawal of the plasma gun or electrode allows a lower stabilizing potential to be applied for the purpose of stabilizing and maintaining the rotating plasma column.

In yet another embodiment of the invention, the initial plasma is formed not by application of an electrical potential to the feed gas, but rather by axial introduction of a laser beam into a rotating containment tube containing the low pressure feed gas, so as to induce ionization of the feed gas. In this embodiment rotation of the gas and the plasma is induced by viscous drag of the rotating containment tube.

The invention is based on creating and pre-conditioning the rotating plasma column so that it is long, stable, uniform, insulated from the interior wall of the containment tube, and has an optimum radial density profile for producing soft x-ray radiation with higher intensity and for a longer time period than the previously known soft x-ray lasers. The coherency of the x-ray radiation will vary depending on the particular physical parameters of the initial plasma and the z-pinch compression of the plasma. The invention provides both the method of producing stimulated emission of soft x-ray radiation, comprising the steps described above, as well as the apparatus for carrying out the method, as described by reference to the embodiments identified above and described in further detail below.

These and other aspects of the invention are more readily apparent from the following detailed description of the invention and the attached drawings.

BRIEF DESCRIPTION OF THE DRAWINGS

The accompanying drawings form a part of and are incorporated in this specification. In the drawings.

The accompanying drawings constitute part of the present specification and are best understood by reference to the following detailed description of the invention.

DETAILED DESCRIPTION OF THE INVENTION

Figure 1:
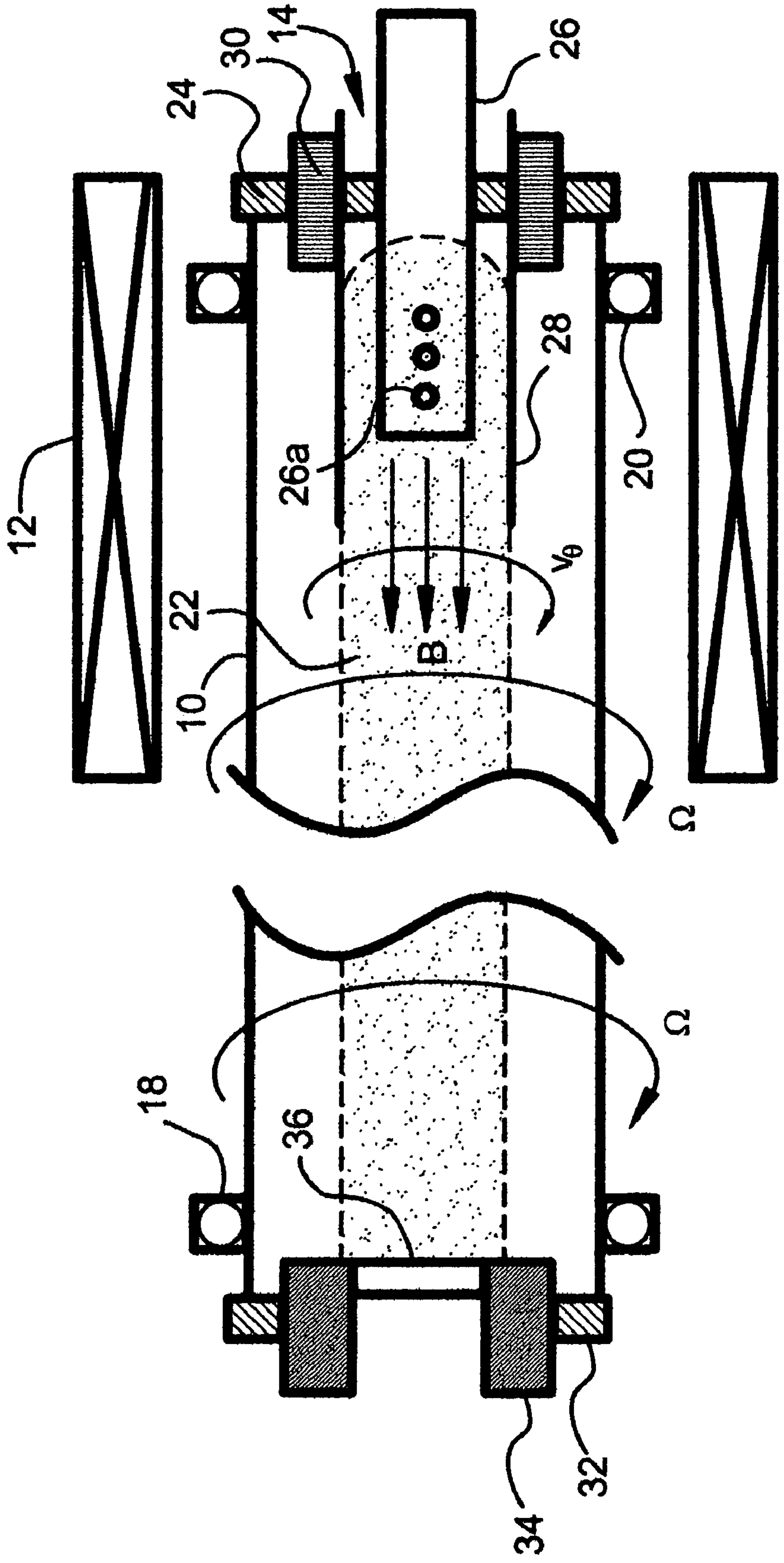
FIG. 1 is a schematic diagram illustrating a preferred embodiment of a soft x-ray laser constructed in accordance with the present invention, utilizing a plasma gun and a solenoidal magnet to produce an initial rotating plasma column in a rotating containment tube.

FIG. 1 illustrates a preferred embodiment of a soft x-ray laser constructed in accordance with the present invention. The laser includes a cylindrical glass or quartz containment tube 10 surrounded by a solenoidal electromagnet coil 12 that is oriented coaxially with respect to the tube 10. A plasma gun 14 is located at one end of the tube 10. The tube 10 is journalled in bearing assemblies 18 and 20 and is connected to a drive mechanism (not shown) that rotates the tube 10 about its longitudinal axis at a rotational speed Ω.

Briefly, the laser operates in two steps. In the first step, with the tube 10 being evacuated and an axial magnetic field B of several kilogauss (kG) being established in the tube 10 by application of a current to the electromagnet coil 12, a rotating plasma jet is created and injected into the rotating tube 10 to produce an elongated, rotating plasma column 22. In the second step, a high power electrical pulse is applied axially through the plasma column, resulting in a rapidly increasing axial current that in turn results in z-pinch compression of the plasma column 22 radially inwardly to produce stimulated emission of soft x-ray radiation along the axis of the plasma column 22. These steps and the apparatus used to conduct them are described further below.

The plasma gun 14 is located at and extends into one end of the tube 10. The plasma gun 14 operates to inject a rotating plasma jet at supersonic speed into the tube 10, forming a plasma column 22 in the form of an elongated region of partially ionized gas generally centered on the axis of the tube 10. The plasma gun 14 protrudes through and is affixed to an end wall 24 that is affixed to the tube 10. The plasma gun 14 includes an electrically conductive inner tubular cathode 26, which also functions as a gas feed tube, and a coaxial, electrically conductive, tubular outer anode 28. The tubular anode 28 has an open end. The cathode 26 has a closed end and includes perforations 26*a* adjacent its closed end. Both the cathode 26 and the anode 28 are stationary. A suitable rotating feed-through including a circular seal 30 in the end wall 24 allows the anode 28 and cathode 26 to remain stationary while the tube 10 is rotated. Anode 28 and cathode 26 are connected to a suitable power supply (not shown). The operation of a plasma gun much like that utilized in the preferred embodiment of the present invention is disclosed in greater detail in T. Ikehata et al., Effects of a Conducting Mesh on the Speed of JxB Driven Rotating Plasmas, 1998 ICPP&25$^{th}$ EPS Conf. on Contr. Fusion and Plasma Physics, Praha, 29 June-3 July, ECA Vol. 22C, 2690-2693.

The end of cathode 26 is spaced inwardly from the end of anode 28. In operation, the containment tube 10 is evacuated and an aliquot of a feed gas, for example argon, is introduced from an exterior source (not shown) through the tubular cathode 26 and radially outwardly through the perforations 26*a*.

An electrical potential is applied across the cathode 26 and anode 28 as the feed gas is emitted from the cathode 26. As the feed gas flows radially outward from the perforations 26*a*, it is partially ionized in the annular space between the anode 28 and cathode 26 by the electrical potential and resulting current flowing through the gas to produce a plasma. This potential, referred to herein as the plasma generation potential, has a voltage of approximately 1 to 10 kilovolts and produces a current in the range of 1 to 10 kiloamperes under typical operating conditions. This plasma generation potential has a typical duration of 10 to 50 microseconds, and may be applied as a series of pulses, as may be necessary to produce the plasma column 22.

The solenoidal electromagnetic coil 12 produces a constant axial magnetic field B inside the tube 12, at a field strength of preferably between approximately 1 and 4 kiloGauss. The axial magnetic field acts on the current flowing radially outwardly through the ionized feed gas between the cathode 26 and anode 28 of the plasma gun 14 to impart an axial rotation $V_{\ominus}$ to the ionized gas of approximately $10^6$ radians per second, which is then emitted axially from the open end of the anode 28 to form the rotating plasma column 22. Thus, upon its formation, the plasma column 22 is rotating about the axis of the tube 10 as a consequence of the magnetic field B created by the solenoidal electromagnet coil 12. It will be noted from FIG. 1 that the relative dimensions of the plasma gun 14 and the rotating tube 10 are such that the rotating plasma column 22 is spaced from the interior wall of the tube 10, and is separated from such interior wall by a layer of rotating, non-ionized feed gas. While the actual boundary between the rotating plasma column 22 and the surrounding feed gas is of course gradational and is not as distinct as shown in FIG. 1 for purposes of illustration. However, the relative sizes of the anode 28, cathode 26 and tube 10 are nevertheless a factor in reducing ablation of the tube material by maintaining a rotating sheath of non-ionized feed gas around the inner rotating plasma column 22.

The tube 10 is rotated in the same rotational direction as that imparted to the plasma column 22 by the solenoidal electromagnet 12, such that the rotating tube 10 further reinforces and maintains the rotation of the plasma column 22.

The x-ray laser further includes an end wall 32 at the end of the tube 10 opposite the plasma gun assembly 14. Centered in the end wall 32 is a second, circular cathode 34, which contains a window 36 that is centered on the axis of the containment tube 10 and which is effectively transparent to x-rays. A stabilizing potential and resulting current may be applied between the cathode 34 and the anode 28, to stabilize the rotating plasma column 22 as it is formed by the plasma gun 14.

Upon formation and stabilization of the rotating plasma column 22 along the axis of tube 10, a second, more powerful electrical pulse, also referred to herein as the z-pinch pulse, is applied across the anode 28 of the plasma gun assembly 14 and the second cathode 34 at the opposite end of the tube 10. Stabilization of the rotation of the plasma column 22 prior to application of the second pulse is assisted by the co-rotating tube 10. A modest dc current may also be applied axially through the plasma column for this purpose. The second pulse is a high voltage, high current signal on the order of 700 kilovolts to 1 megavolt, which drives a rapidly rising high current of up to approximately 20 kiloamps, depending on the length of tube 10.

The result of the application of the z-pinch pulse along the length of the plasma column 22 is a rapidly rising axial current, which in turn produces a rapidly rising azimuthally symmetric magnetic field encircling the plasma column 22, which in turn compresses the plasma column 22 radially inwardly. This compression is the phenomenon known as the z-pinch. During the final stage of compression, when plasma electron temperature and density both reach high levels, a population inversion is created and coherent x-ray radiation is emitted by the population of highly charged ions in the plasma column 22, by collisional electron excitation, and is amplified by traveling along the plasma column 22. Soft x-ray radiation is emitted in all directions, but is only coherent along the axis, from which it is emitted through the window 36.

Operating conditions will vary depending on the feed gas employed and the various physical and electrical parameters of the apparatus. Coherency of the x-ray laser radiation is determined by the physical characteristics of the compressed plasma column and the z-pinch pulse.

The containment tube 10 is preferably formed of glass or quartz and in the preferred embodiment is approximately 100 centimeters in length. The inner diameter of the tube 10 may be between approximately 5 and 30 cm, and the diameter of the outer anode 28 of the plasma gun assembly 14 may be between approximately 2 to 15 cm. Rotational speeds of the tube 10 are preferably on the order of 20,000 to 130,000 revolutions per minute.

The principle limitation on the length of the tube 10 is the upper power limit of the power supply providing the z-pinch pulse between the second cathode 36 and the anode 28, as the power required for the z-pinch pulse is proportional to the length of the tube 10. For example, for a laser utilizing Ar as the feed gas, the axial plasma current must be on the order of 20 kA to 40 kA to achieve adequate z-pinch compression to achieve stimulated emission of soft x-rays having wavelengths in the range of 25 to 50 nanometers, and voltages on the order of a megavolt are required to achieve a current of this level in a containment tube 100 cm in length. Power supplies suitable for this purpose include capacitor based or induction based electrical power supplies. Higher power levels are required to achieve lasing at shorter wavelengths.

The noble gases Ne, Ar, Kr, and Xe are preferably used as feed gases, either pure or as mixtures, and various minor additional constituents may be added. For example, gaseous or micro-particulate metallic species may be added to achieve particular effects. Operating pressures for the feed gas in the containment tube 10 are considerably less than one atmosphere, and are typically no more than several torr. A preferable pressure range is from 400 to 800 millitorr.

One advantage of the present invention over previously known z-pinch x-ray sources is that rotation of the feed gas and the initial plasma column 22 results in a radially concave density and mass profile, due to the centrifugal force acting on the feed gas and the plasma column 22. When the plasma column 22 is initially produced it is insulated from the rotating wall of the containment tube 10 by a neutral sheath layer of feed gas, which has a slightly higher density toward the wall of the containment tube 10 due to centrifugal force created by the drag of the rotating containment tube 10 on the feed gas. Calculations indicate that this initial concave density and mass distribution does not affect the z-pinch dynamics, but on the contrary, preserves the concave shape of the radial profile for a longer time during z-pinch compression, resulting in improved stability of the compressed plasma. This in turn reduces detrimental effects arising from refraction of the resulting x-ray radiation, which decreases the intensity of the emitted soft x-rays. Further, wall ablation of the tube 10 is essentially eliminated by the insulating sheath layer of high-density neutral feed gas surrounding the plasma column 22, which is optimized by appropriate combination of feed gas pressure and flow rates, rotational speed Ω of the tube 10, the dimensions of the tube 10 and the plasma gun 14, and physical parameters of the initial plasma.

Further, the high length-to-diameter aspect ratio of the compressed plasma column 22 minimizes the trapping of transfer radiation and substantially increases the intensity of emitted x-ray radiation. In addition, rotation of the plasma column 22 results in higher uniformity and improved stability of the longitudinal profile of the compressed plasma column 22.

Figure 2:
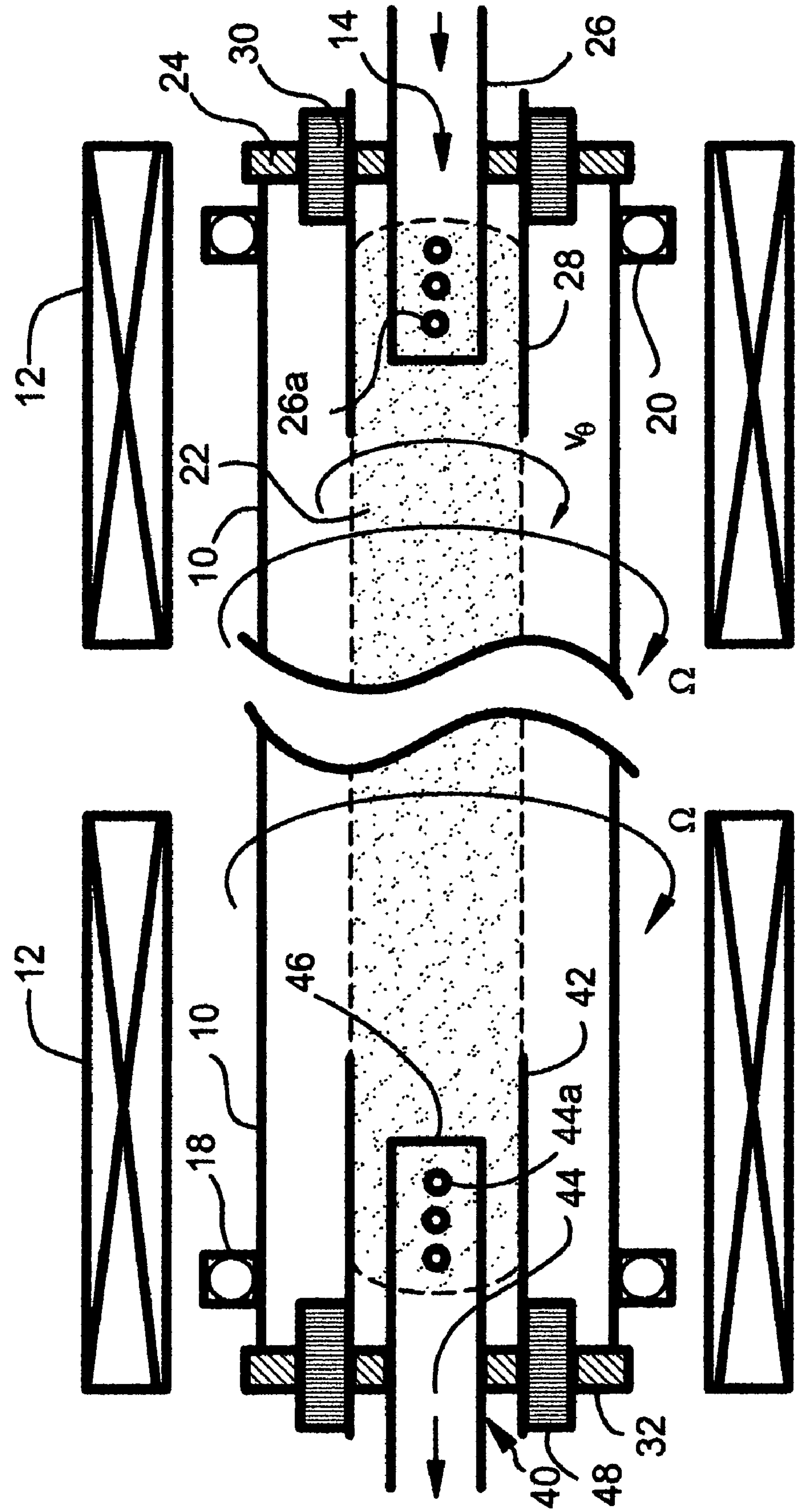
FIG. 2 is a schematic diagram of a an embodiment of the invention also including a plasma gun as illustrated in FIG. 1, and also including a pair of concentric electrodes at the opposite end of the tube from the plasma gun, for imparting an additional rotating force to the plasma at the opposite end of the tube from the plasma gun.

A second embodiment of the invention is illustrated in FIG. 2. In this second embodiment, elements of the apparatus that are identical to the elements shown in the embodiment of FIG. 1 are illustrated with the same reference numerals as those shown in FIG. 1.

In the embodiment shown in FIG. 2, the second cathode 34 and the x-ray window 36 of the embodiment shown in FIG. 1 are replaced with a combined cathode and gas collection assembly 40, which resembles, but is not identical to, the plasma gun 14 at the opposite end of the tube 10. A tubular cathode 42 having an open end extends into the tube 10. Inside the tubular cathode 42 is a coaxial gas collection tube 44 having an x-ray window 46 at its end, and which includes perforations 44*a* adjacent the x-ray window 46. The cathode 42 and gas collection tube 44 remain stationary with respect to the end wall 32 and are connected thereto by means of a suitable seal 48, which permits gas in the containment tube 10 to be pumped out of the containment tube 10 while the entire assembly is rotating. X-rays produced in the plasma column 22 are emitted through the window 46 and through the gas collection tube 44.

A voltage is applied across the cathode 42 and the gas collection tube 44, so as to create a radial electrical current flowing through the plasma between the cathode 42 and the collection tube 44 as the plasma is collected in the gas collection tube 44. This current, together with the magnetic field imposed by the solenoidal electromagnetic coil 12, creates a rotational force that functions to maintain the rotation of the plasma column 22, and which supplements the rotation of the plasma column induced by the drag of the rotating containment tube 10.

Figure 3:
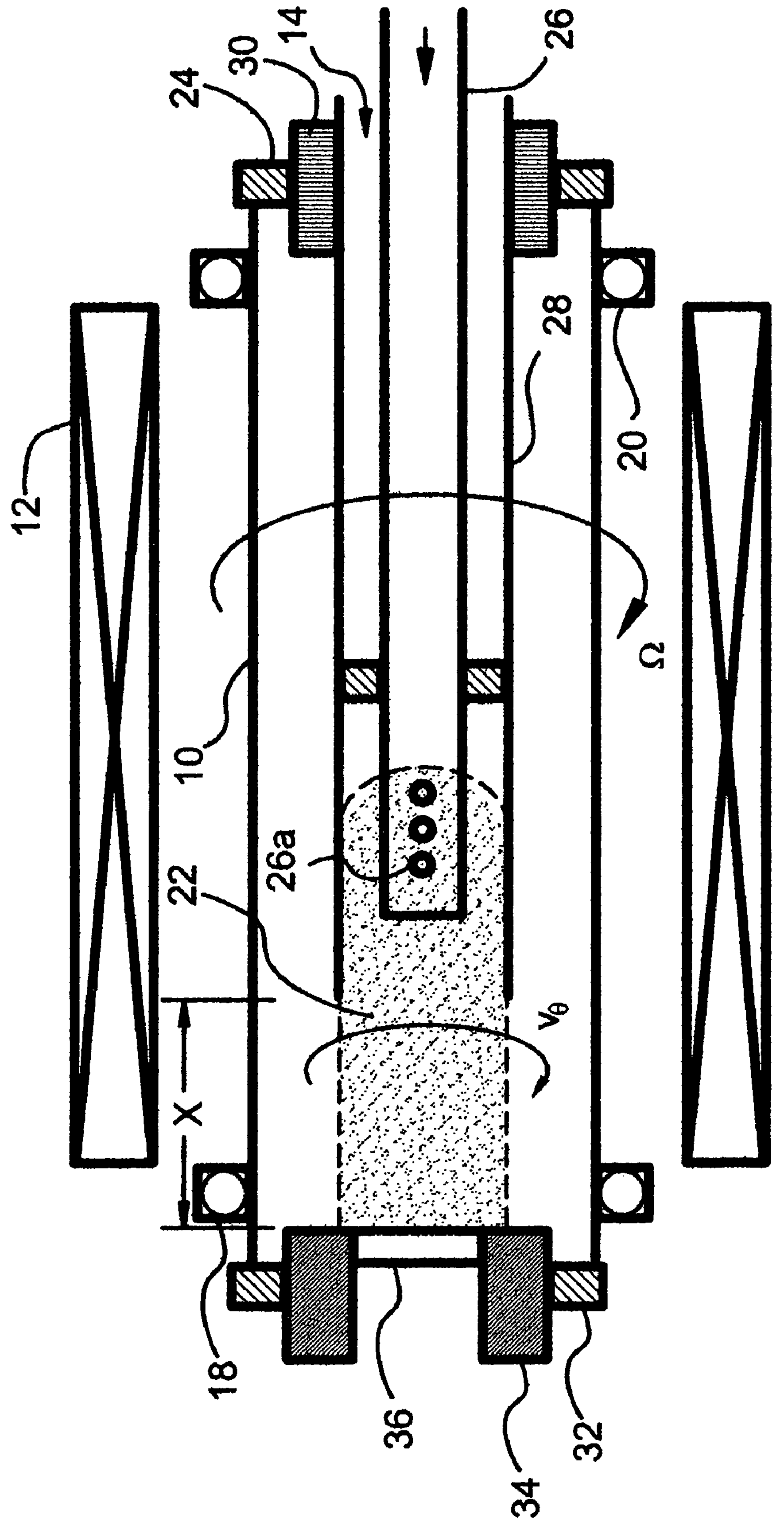
FIG. 3 is a schematic illustration of an embodiment similar to the embodiment shown in FIG. 1, wherein a plasma gun is mechanically retractable along the length of the rotating containment tube.

In another embodiment, which is shown in FIG. 3 and which is most closely related to the embodiment of FIG. 1, the plasma gun 14 is elongated and is retractable, such that it may first inserted into the containment tube 10 along much of its length and may then be retracted from the rotating containment tube 10 as the plasma column 22 is formed. Referring to FIG. 3, the plasma gun 14 is initially inserted into the containment tube 10 until the anode 28 is positioned at a relatively short distance X from the opposite end wall 32 of the tube 10. As the rotating plasma column 22 is formed, the plasma gun 14, including both its anode 28 and cathode 26, is progressively withdrawn until the rotating plasma column 22 occupies the full length of the containment tube 10. A stabilizing potential may be applied across the cathode 34 and anode 28, as the anode 28 is withdrawn, to stabilize the plasma column 22 as it is formed. The advantage of this embodiment is that the plasma column 22 can be more uniformly established along the length of the containment tube 10. Once the plasma column 22 is established along the full length of the tube 10 and the plasma gun 14 is withdrawn as far as possible, the z-pinch pulse is applied across the anode 28 and cathode 34 to compress the plasma column 22 and produce stimulated emission of soft x-ray laser radiation axially along the compressed plasma column.

Figure 4:
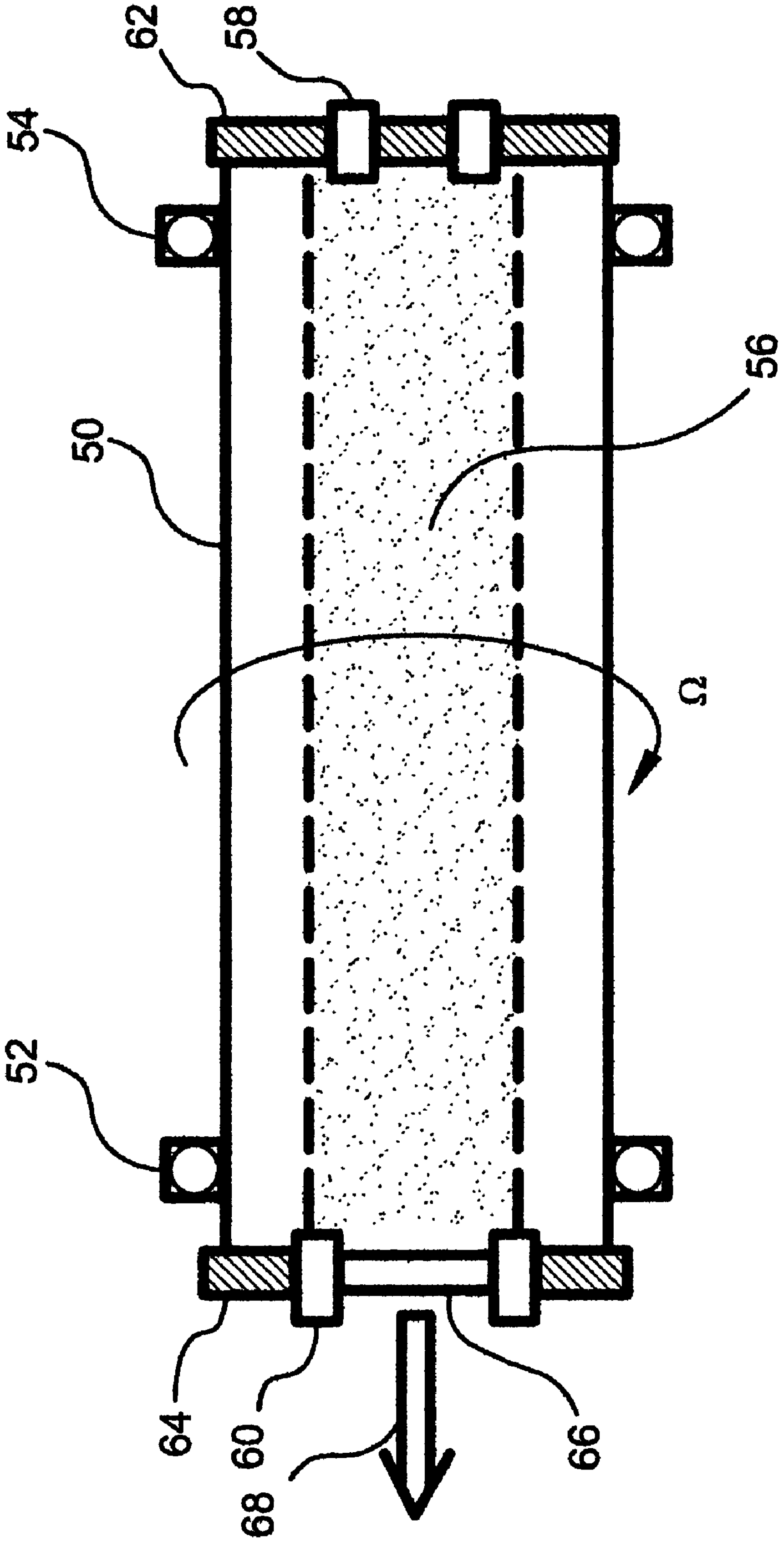
FIG. 4 is a schematic illustration of a soft x-ray laser based on the method and apparatus of the present invention, wherein an electrical discharge is used to create the initial plasma column and the resulting plasma column is rotated exclusively by viscous drag of a rotating containment tube.
Figure 5:
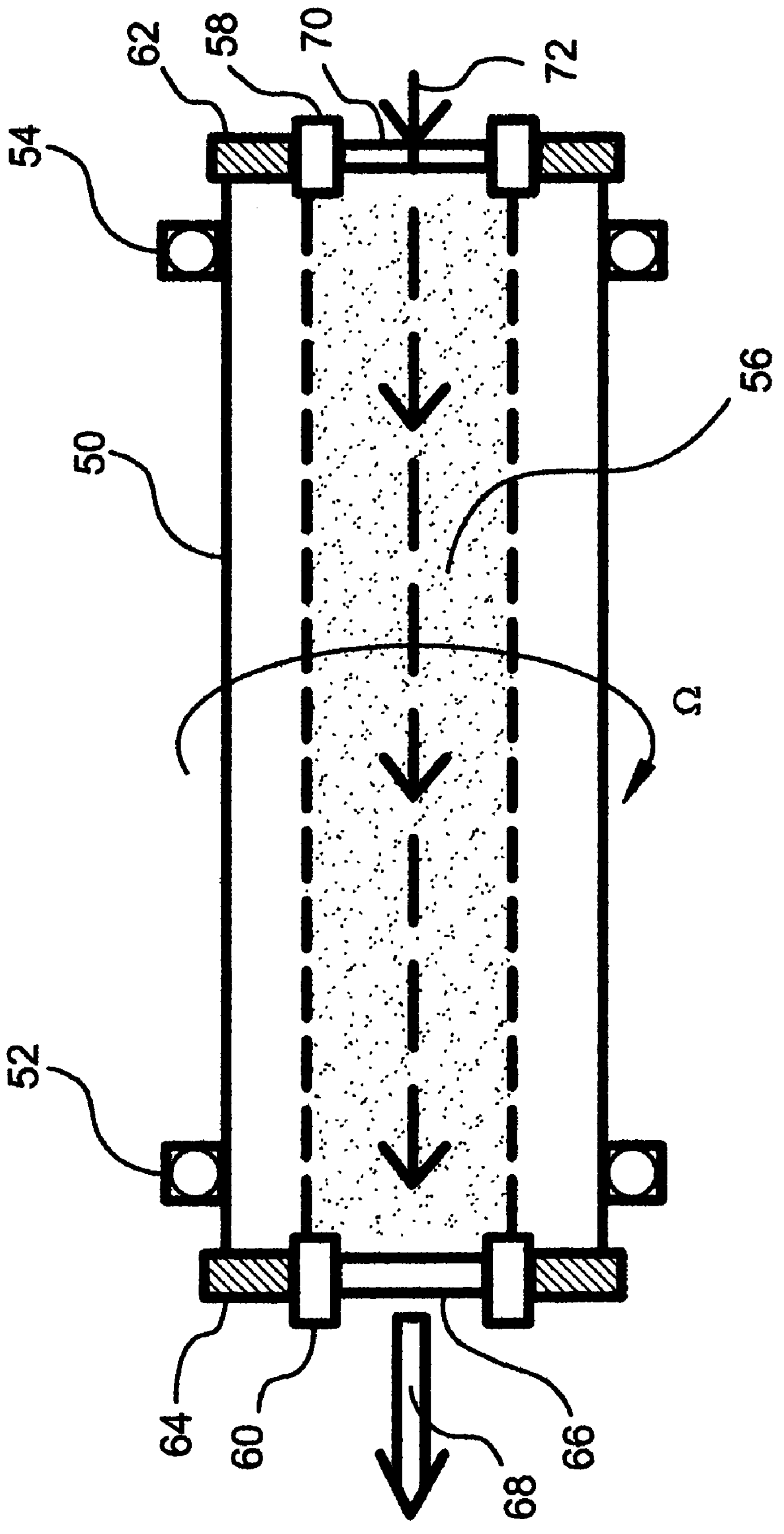
FIG. 5 is a schematic illustration of a soft x-ray laser based on the method of the present invention, wherein a laser beam is employed to produce the initial plasma column and rotation of the plasma column is induced by viscous drag of a rotating containment tube.

As noted above, the initial rotating plasma column may be produced either by an electrical discharge through a low pressure feed gas, as thus far described with regard to the embodiments shown in FIGS. 1 through 3, or by laser induced breakdown of the feed gas. FIGS. 4 and 5 illustrate in schematic form two simplified embodiments of the present invention wherein an electrical pulse and a laser pulse are employed, respectively, to create the initial plasma column in a rotating containment tube. In each of these embodiments rotation of the plasma column is obtained entirely by viscous drag of the rotating tube on the feed gas. Consequently the axial magnetic field and the magnetically induced rotation of the plasma column of the embodiments shown in FIGS. 1 through 3, are not employed.

In the embodiment shown in FIG. 4, a rotatable containment tube 50 is journalled in bearings 52 and 54 and is driven in rotation by a drive mechanism (not shown) in the same manner as the embodiments described above. An initial plasma column 56 is produced by passing a suitable direct current through the feed gas, for example argon, which is maintained in the tube 50 at a low pressure on the order of one torr or less. An electric discharge is passed between two circular electrodes 58 and 60 centered in end walls 62 and 64 at opposite ends of the containment tube 50. Electrode 58 includes a centered x-ray window 66. The initial plasma column 56 is essentially maintained in a steady state condition by application of a voltage across the electrodes 58 and 60 that is sufficient to maintain a continuous direct current flowing through the tube 50. Rotation of the plasma column 56 is obtained entirely by viscous drag of the rotating tube 50.

A high voltage, high current z-pinch pulse is applied to the initial plasma column 56, using a power supply comparable to that described above with regard to the embodiments shown in FIGS. 1 and 2. The application of the high voltage, high current pulse results in a rapidly increasing current flowing through the initial rotating plasma column 56, which in turn results in z-pinch compression of the column 56 and stimulated emission of x-rays 68, which are emitted through window 66.

The embodiment shown in FIG. 5 is similar to that shown in FIG. 4, and like elements are comparably numbered. The embodiment of FIG. 5 differs however by the presence of a window 70 in end wall 62, by which an ionizing laser beam 72 is introduced into the feed gas in the tube 50, ionizing it to form a plasma column 56 that is rotated by viscous drag of the rotating tube 50. A stabilizing potential may be applied across the electrodes 58 and 60 to maintain and stabilize the rotating plasma column 56. Upon application of the high power z-pinch pulse across electrodes 58 and 60, the rotating plasma column 56 is compressed until stimulated emission of x-ray radiation 68 occurs, resulting in soft x-ray radiation being emitted through window 66.

Stimulated emission of x-ray radiation in fact occurs in both directions along the axis of the compressed plasma column 56, although it shown as beam 68 in FIG. 5 in order to distinguish it from the ionization laser radiation 72 introduced into the tube 10 at the opposite end.

In this embodiment the application of the short pulse of laser radiation 72, in lieu of the electrical discharge of all the previously described embodiments, functions to initially ionize the feed gas and form the plasma column in the rotating tube.

While the present invention is described herein by reference to several preferred embodiments, it will be understood that various alterations, substitutions and deviations which may be apparent to one of ordinary skill in the art may be made without departing from the essential invention. Accordingly, the present invention is defined by the following claims.

The embodiments of the invention in which patent protection is claimed are defined as follows:

1. A method of producing stimulated emission of soft x-ray radiation by z-pinch compression of a rotating plasma, comprising the steps of:

applying a magnetic field to a rotating containment tube having a longitudinal axis and first and second ends, said magnetic field being applied by operation of a solenoidal electromagnet positioned concentrically around said rotating containment tube, the axis of said magnetic field and of said solenoidal electromagnet extending coaxially with said axis of said rotating containment tube;

introducing a feed gas into said rotating containment tube by emission from a plasma gun at said first end, said plasma gun having a tubular cathode positioned coaxially inside a tubular anode, said tubular cathode and said tubular anode being positioned coaxially with respect to one another and with respect to said longitudinal axis of tubular cathode and said tubular anode, said tubular cathode and said tubular anode defining an annular space between them which opens into said tubular cathode and said tubular anode at said first end, said tubular cathode having perforations therein, said feed gas being introduced through said tubular cathode and emitted radially outwardly therefrom through said perforations into said annular space;

ionizing said feed gas as it is emitted from said tubular cathode by application of an electric potential across said tubular cathode and said tubular anode so as to ionize said feed gas and to produce a rotating plasma column in said tubular cathode and said tubular anode that is driven in rotation by said magnetic field and by mechanically induced viscous drag of said rotating containment tube; and passing a rapidly increasing axial electric current through said rotating plasma column by application of a high power, high voltage electrical potential of at least approximately 700,000 volts to said rotating plasma column between said tubular anode of said plasma gun at said first end and a second cathode at said second end of said rotating containment tube, so as to magnetically compress said rotating plasma column solely by z-pinch compression to a temperature and density sufficient to achieve population inversion and resulting stimulated emission of soft x-ray radiation.

2. The method defined in claim 1 wherein said feed gas is at an operating pressure of between approximately 400 and 800 millitorr.

3. The method defined in claim 1 wherein a concave density profile is created in said rotating plasma column driven by rotation by said magnetic field and by said mechanically induced viscous drag of said rotating containment tube.

4. A soft x-ray laser comprising:

a rotating containment tube for containing a low pressure feed gas and a low pressure plasma produced therein, said tube having a central axis and first and second ends, a tubular anode and a cathode at said first and second ends, respectively, and an x-ray window at least one of said ends;

a plasma gun positioned at said first end within said rotating containment tube, said plasma gun having a tubular cathode positioned coaxially inside said tubular anode, said tubular cathode and said tubular anode being positioned coaxially with respect to one another and also with respect to said central axis of said rotating containment tube, said tubular cathode and said tubular anode defining an annular space between them which opens into said rotating containment tube at said first end, said tubular cathode having perforations therein, said feed gas being introduced through said perforations in said tubular cathode and emitted radially outwardly therefrom into said annular space;

means for applying an electric signal across said annular space between said tubular anode and said tubular cathode so as to ionize said feed gas as it is emitted radially outwardly from said tubular cathode, so as to produce said low pressure plasma in said rotating containment tube;

a solenoidal electromagnet positioned concentrically around said rotating containment tube for inducing rotation of said low pressure plasma as said low pressure plasma is generated between said tubular cathode and said tubular anode and to form a rotating plasma column in said rotating containment tube, wherein said rotating plasma column is driven mechanically by viscous drag induced by said rotating containment tube and is also driven magnetically by an axial magnetic field created by said solenoidal electromagnet; and a power supply for applying a high power electrical pulse having a potential of at least approximately 700,000 volts between said tubular anode at said first end and said cathode at said second end of said rotating containment tube, so as to produce a rapidly increasing axial electrical current through said rotating plasma column and compress said rotating plasma column solely by z-pinch compression sufficiently to produce stimulated emission of soft x-rays.

5. The soft x-ray laser defined in claim 4 wherein said feed gas is at an operating pressure of between approximately 400 and 800 millitorr.

6. The soft x-ray laser defined in claim 4 further comprising a gas collection assembly at said second end of said rotating containment tube, from said plasma gun, said cathode at said second end of said rotating containment tube comprising a tubular cathode of said gas collection assembly, and where said gas collection assembly includes a gas collection tube located coaxially within said tubular cathode, said gas collection tube including an x-ray window at said second end and multiple perforations adjacent said second end, wherein said gas collection tube is for applying a voltage across said second cathode and said gas collection tube, and means for evacuating gas from said rotating containment tube through said gas collection tube.

* * * * *